UNITED STATES PATENT OFFICE.

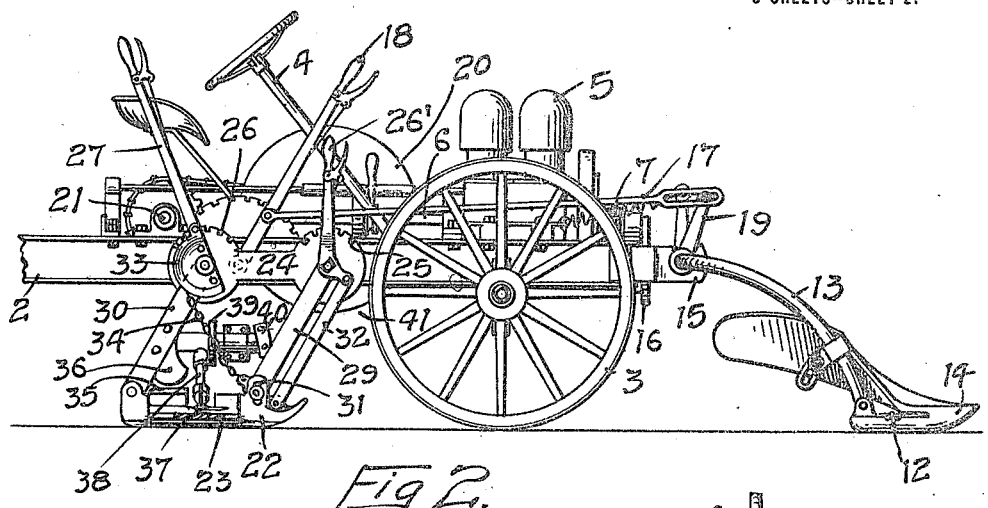
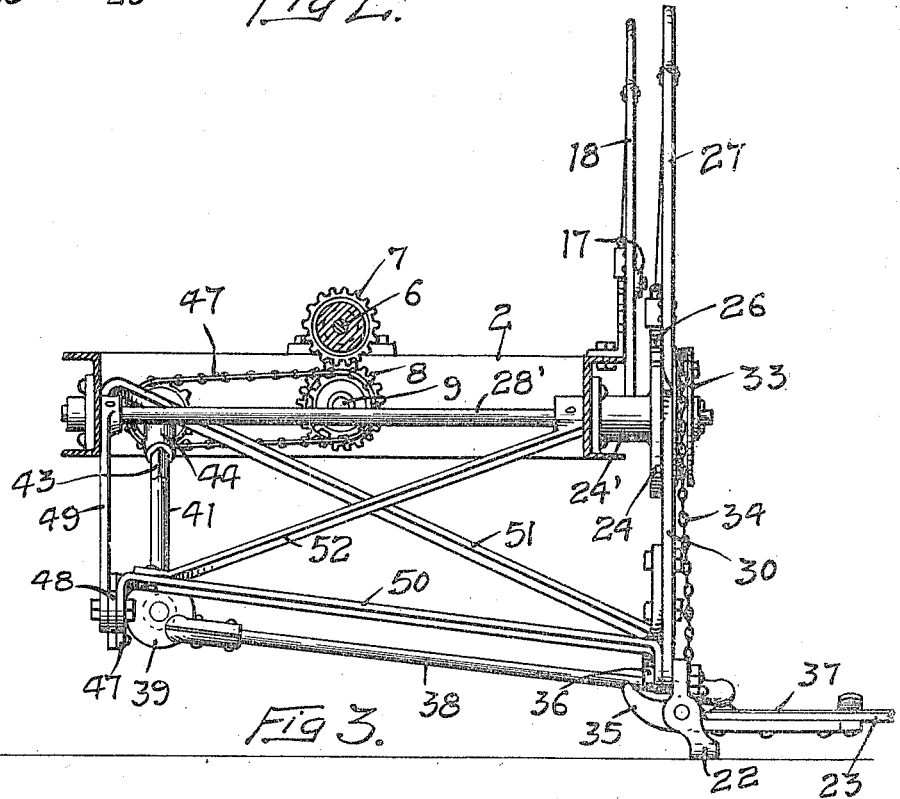

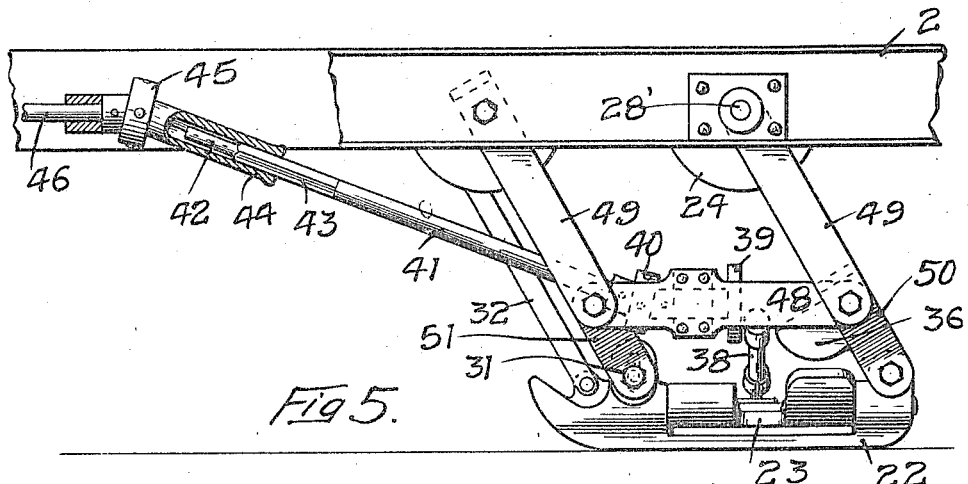
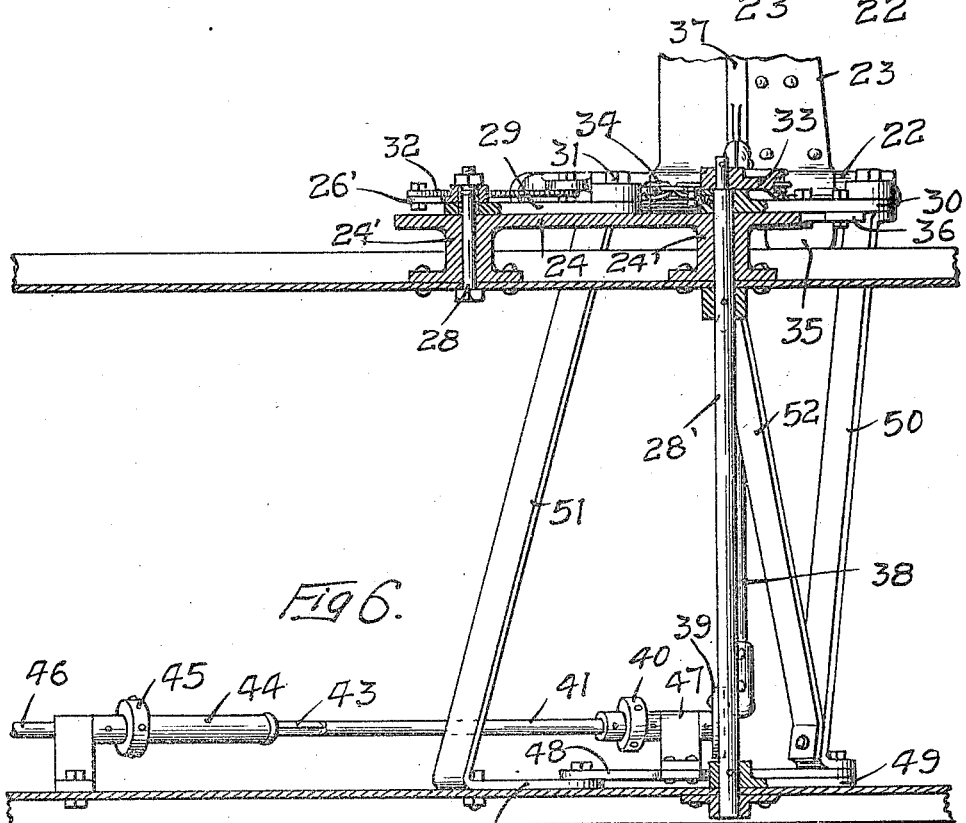

NILS NILSON AND LEONARD NILSON, OF WAYZATA, MINNESOTA.

MOWING-MACHINE.

1,164,305.  Specification of Letters Patent.  Patented Dec. 14, 1915.

Application filed May 29, 1911. Serial No. 630,222.

*To all whom it may concern:*

Be it known that we, NILS NILSON and LEONARD NILSON, of Wayzata, Hennepin county, Minnesota, have invented certain new and useful Improvements in Mowing-Machines, of which the following is a specification.

The object of our present invention is to provide a mowing machine having in addition to the cutting knife in front of the machine an auxiliary or side cutter by means of which the capacity of the machine can be doubled.

A further object is to provide an auxiliary mowing apparatus or side cutter in which either cutting mechanism can be used independently of the other one, or both of them can be operated simultaneously, if desired.

Our invention consists generally in a mowing machine having a source of power and a side cutter bar operatively connected with said source of power.

Further the invention consists in improved means for supporting and operating the side cutter bar.

Figure 1:
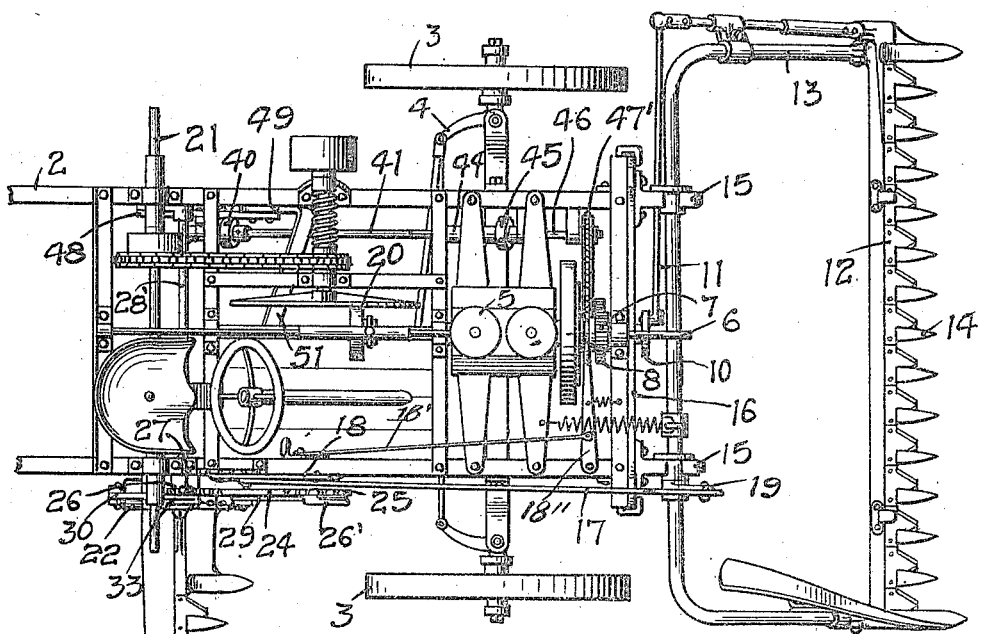
Figure 4:
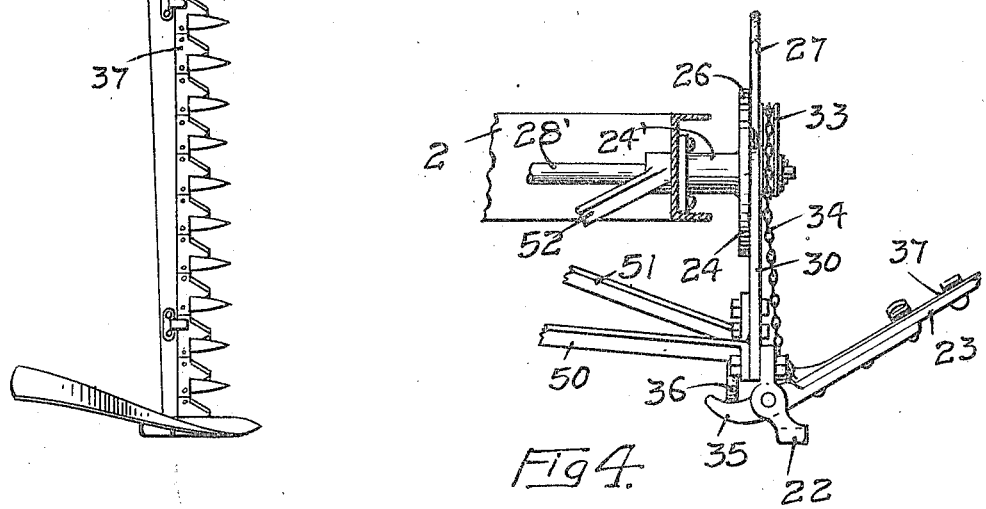

In the accompanying drawings forming part of this specification, Figure 1 is a plan view of a mowing machine embodying our invention, Fig. 2 is a side view, partially in section, of the same, Fig. 3 is a detail sectional view, illustrating the driving mechanism of the side cutter bar and showing the bar in its lowered operative position, Fig. 4 is a detail view showing the cutter-bar partially raised, Fig. 5 is a side view looking at the opposite side of the machine from the view in Fig. 2, Fig. 6 is a horizontal sectional view, showing the position of the driving connections with respect to the cutter-bar mechanism.

In the drawing, 2 represents the frame of the machine, having forward carrying wheels 3 and a steering apparatus 4.

5 is a source of power mounted on the machine, consisting, preferably, of an internal combustion engine and 6 is an engine shaft having a gear 7 thereon meshing with a gear 8 on a shaft 9. This shaft 9 has a crank disk 10 with a pitman connection 11 therefrom to the cutter-bar 12 of the forward mower 13, which is equipped with the usual finger bar 14. This forward mower forms the subject-matter of a companion application of even date herewith and will need no detailed description herein except to state that it is pivotally supported in brackets 15 mounted on a rocker 16 and is oscillated in said brackets by means of a rod 17 and an operating lever 18 connected with one end of said rod, the other end having a sliding connection with an arm 19. This rocker 16 allows the mower frame to swing vertically and accommodate itself to the inequalities of the ground, the rocker being centrally pivoted on the machine frame and having guides at its ends which prevent the rocker and mower frame from swinging forwardly in the operation of the machine.

18' represents a rod connected with a clutch lever 18", which controls the mower clutch.

The engine has a friction drive 20 through which power is transmitted to a driving shaft 21.

The side cutter, which forms the subject-matter of this application, consists of a shoe 22 in which the inner end of the finger bar 23 is pivoted. A plate 24 has hubs 24' secured to the side of the machine frame and is provided with racks 25 and 26 and levers 26' and 27 having locking latches to engage said racks. The hubs 24' form bearings for a bolt 28 and a shaft 28'. Parallel links 29 and 30 connect the forward and rear portions of the shoe 22 respectively with the pivots of the levers 26' and 27 and the links 29 have a slotted connection 31 which allows the shoe to be tilted according to the length of the cut desired, the shoe being raised and lowered at its forward end by means of a link 32 which connects the forward portion of the shoe with the lever 26'. The lever 27 has a quadrant 33 thereon and a flexible connection 34 leading from said quadrant to the forward portion of the shoe 22 so that when the lever 27 is thrust forward the shoe will be lifted and swung backwardly on the pivots of the links 29 and 30, these links causing the shoe and cutter-bar to maintain a substantially horizontal position during the initial backward movement. When the shoe has been lifted a predetermined distance, the inner end 35 of the finger bar will contact with a lug 36 on the link 30 and this contact will cause the finger bar to be tilted from a horizontal to an upright position, the degree of the tilting movement depending upon the distance the shoe is lifted from the ground. This movement allows the cutter bar to be raised or lowered easily and quickly, maintaining at the same time a horizontal position until the shoe is raised at a point where the finger bar will engage the lug 36 and cause the finger bar to swing to a position where it will clear any obstruction in the path of the machine.

37 is the cutter-bar, having a pitman-rod connection 38 with a crank disk 39 which has a universal joint connection 40 with a shaft 41. This shaft has a portion 42 at one end, circular in cross section, and a portion 43, substantially square in cross section, and the end of the shaft is slidable in a hub 44 having a socket in which the portion 43 fits and is held against revolution. 45 is a universal joint connecting the hub 44 with a shaft 46 which has a driving connection 47' with the shaft 9. (See Figs. 1 and 3). The crank disk 39 is supported in a bracket 47 secured to a bar 48 that is pivotally supported by parallel links 49 from the frame of the machine, and these links move in unison with the links 29 and 30 on the opposite side of the machine and the location of the pitman rod and its connection with the crank disk allows freedom of movement of the cutter-bar a sufficient distance to swing it to an upright position so that the machine can readily pass through a gate opening or other narrow space. The rear links on opposite sides of the machine are preferably supported on the transverse shaft 28' which has bearings in the frame of the machine. Braces 50 and 51 are arranged transversely of the machine between the parallel links and a bar 52 connects the brace 50 with the shaft 28'. These braces hold the parallel links in alinement and also resist the end thrust of the cutter-bar.

In the operation of the machine, the forward movement of the lever 27 will rock the shaft 28' and raise the shoe, swinging it on the parallel links upwardly and backwardly toward the frame of the machine. This backward movement of the shoe and the links will move the shaft 41 lengthwise, pulling it out of the hub 44 until it reaches a point where the squared portion 43 will be withdrawn from its socket, and the hub may then be revolved freely without driving the shaft 41. At any time, therefore, the operator can lift the shoe and the cutter-bar off the ground and by moving the shoe and bar a predetermined distance can render the driving connection between the hub 44 and the pitman inoperative, all by the movement of the single lever.

We claim as our invention:—

1. The combination, with a frame having carrying wheels and a source of motive power mounted thereon, of a shoe extending lengthwise of said frame, forward and rear parallel links pivotally connecting said shoe with said frame, and mounted in a substantially vertical plane a finger bar mounted in said shoe, a cutter bar carried by said finger bar and having driving connections with said source of motive power, and means for raising and lowering said shoe and finger bar.

2. The combination, with a frame having carrying wheels and a source of power mounted on said frame, of a shoe, parallel links pivotally connecting said shoe with said frame, a finger-bar mounted in said shoe, a cutter-bar carried by said finger-bar and operatively connected with said source of power, levers mounted on said frame, a link pivotally connecting one of said levers with the forward portion of said shoe, flexible means connecting the forward portion of said shoe with said other lever, whereby said shoe may be tilted or raised bodily, substantially as described.

3. The combination, with a frame having carrying wheels, and a source of power mounted on said frame, of a shoe, links pivotally connecting said shoe with said frame, a finger-bar mounted in said shoe, a cutter-bar carried by said finger-bar and operatively connected with said source of power, means for lifting said shoe bodily and means engaging said finger-bar for tilting it to an upright position when said shoe has been lifted a predetermined distance.

4. The combination, with a frame having carrying wheels and a source of motive power mounted on said frame, of a shoe, means pivotally connecting said shoe with said frame, means for lifting said shoe bodily, a finger-bar pivoted in said shoe, a cutter-bar carried by said finger-bar and operatively connected with said source of power, said finger bar having a projecting inner end, and a lug mounted in the path of said projecting inner end in position to engage said end when said shoe has been raised to a predetermined point, for the purpose specified.

5. The combination, with a frame having carrying wheels and a source of motive power mounted thereon, of a shoe arranged at one side of said frame and extending lengthwise thereof, forward and rear links connected at their upper ends to said frame and pivotally connected at their lower ends to said shoe, means for lifting said shoe, said links holding said shoe in a substantially horizontal position during its vertical movement, a finger bar mounted in said shoe and projecting laterally therefrom, a cutter-bar mounted in said finger bar, and means operatively connecting said cutter bar with said source of power.

6. The combination, with a frame having carrying wheels and a source of motive power mounted on said frame, of a shoe provided at one side of said frame, parallel links mounted in a substantially vertical plane and pivotally connecting said shoe with said frame, a finger-bar pivoted in said shoe, a cutter-bar mounted in said finger-bar, a drive shaft mounted in bearings in said frame on the opposite side thereof from said shoe and finger-bar and having operative connections with said source of power, and a pitman rod extending transversely of said machine frame and connected at one end to said cutter-bar and at its other end to said drive shaft.

7. The combination, with a frame having carrying wheels and a source of motive power mounted on said frame, of a plate having hubs secured to one side of said frame, a shoe adapted to slide on the ground, parallel links pivotally connecting said shoe with said plate, means for lifting said shoe bodily, a finger-bar pivotally mounted in said shoe, a cutter-bar carried by said finger-bar, a drive shaft mounted in bearings on the opposite side of said frame and operatively connected with said source of power, a pitman rod connecting said cutter-bar with said drive shaft, said shoe, when lifted, swinging backwardly, and said drive shaft having means whereby the backward movement of said shoe during the lifting operation will render said pitman rod inoperative, substantially as described.

8. The combination, with a frame having carrying wheels and a source of motive power mounted thereon, of a mower frame pivotally supported on the front of said wheeled frame, a finger bar, a cutter bar for said mower frame, means operatively connecting said cutter bar with said source of power, a secondary mower, including a finger bar and cutter bar provided at one side of said frame, said cutter bars through their connecting means being operable simultaneously or independently of one another.

9. The combination, with a frame having carrying wheels and a source of motive power mounted thereon, of a mower mounted on the forward portion of said frame in front of said carrying wheels, a secondary mower mounted on said frame in the rear of said carrying wheels, and means operatively connecting said mowers with said source of motive power for independent or simultaneous operation of said mowers.

10. The combination, with a frame having carrying wheels and a source of motive power mounted on said frame, of a mower frame pivotally supported on the front of said wheeled frame, a finger bar, a cutter bar for said mower frame, means operatively connecting said cutter bar with said source of power, an independent secondary mower including a finger bar, a cutter bar provided at one side of said frame, and means connecting the cutter bar of a said secondary mower with said source of power.

11. The combination, with a frame having carrying wheels and a source of motive power, of a shoe, forward and rear parallel links pivotally connected at one end to said shoe and at the other end to said frame and allowing said shoe to rise and fall and adapt itself to the inequalities of the ground, the pivots of said links on said shoe being in the rear of their pivots on said frame and a cutter bar carried by said shoe and operatively connected with said source of motive power.

12. The combination, with a frame having carrying wheels and a source of motive power, of a mower mounted to project in front of said frame, a secondary mower mounted to project outwardly at one side of said frame, and means operatively connecting said mowers with said source of motive power for independent or simultaneous operation of said mowers.

13. The combination, with a frame having carrying wheels and a source of motive power, of a shoe pivotally connected with said frame and adapted to slide upon the ground, parallel links mounted in a substantially vertical plane and pivotally connecting said shoe with said frame to allow it to rise and fall and adapt itself to the inequalities of the ground, the pivots of said links on said shoe being in the rear of their pivots on said frame and a cutter bar carried by said shoe and operatively connected with said source of motive power.

14. The combination, with a frame having carrying wheels and a source of motive power, of a mower mounted on said frame in the rear of said carrying wheels and projecting outwardly from said frame, and means operatively connecting said mower with said source of motive power.

15. In a mowing machine, the combination with a supporting frame, of wheels upon which said frame is mounted, an engine supported upon said frame, a plurality of cutting blades, located in substantially the same horizontal plane, means for mounting said blades upon the machine in positions to cut separate swaths, means for separately swinging said blades upwardly into inoperative positions, and independently controlled means for separately operatively connecting the individual blades with said engine.

16. In a mowing machine, the combination with a supporting frame, of an engine supported upon said frame, a power shaft driven by said engine, a plurality of cutting blades, located in substantially the same horizontal plane, means for mounting said blades upon the machine in positions to cut separate swaths, means for separately swinging said blades upwardly into inoperative position, separately controlled means connected with said power shaft for operating each cutting blade and means for controlling the operation of each blade independently of the operation of the other blades.

17. In a mowing machine, the combination with a supporting frame, of wheels upon which said frame is mounted, an engine supported upon said frame, a plurality of cutting blades, located in substantially the same horizontal plane, means for mounting said blades upon the machine in positions to cut separate swaths, means for separately controlling and operatively connecting said blades with said engine, and means for separately vertically adjusting said cutting blades.

18. In a mowing machine, the combination with a supporting frame, of an engine supported upon said frame, a power shaft driven by said engine, a plurality of cutting blades, located in substantially the same horizontal plane, means for mounting said blades upon the machine in positions to cut separate swaths, a plurality of rotary pitman shafts, independently controlled means separately connecting the individual pitman shafts with said power shaft, and means separately connecting said pitman shafts with the respective cutting blades for reciprocating the latter.

19. The combination, with a frame having carrying wheels and a source of motive power, of a shoe, parallel links mounted in substantially vertical planes upon opposite ends of said shoe and connected with said shoe for allowing it to rise and fall with the inequalities of the ground, the pivots of said links on said shoe being in the rear of their pivots on said frame, a cutter bar carried by said shoe, and operative connections between said source of motive power and said cutter bar.

20. The combination, with a frame, of a shoe, a cutter bar, a link pivotally connected with said shoe and frame for allowing said shoe to rise and fall on its pivotal connection to adapt it for inequalities of the ground, the pivot of said link on said shoe being in the rear of its pivot on said frame, substantially as described.

In witness whereof, we have hereunto set our hands this 24th day of May 1911.

NILS NILSON.
LEONARD NILSON.

Witnesses:
GENEVIEVE E. SORENSEN,
EDWARD A. PAUL.